Sept. 30, 1930.   W. C. BAXTER   1,776,769
FURNITURE JOINT
Filed Feb. 8, 1930
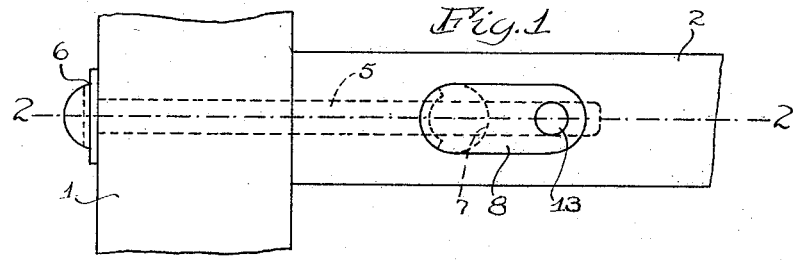
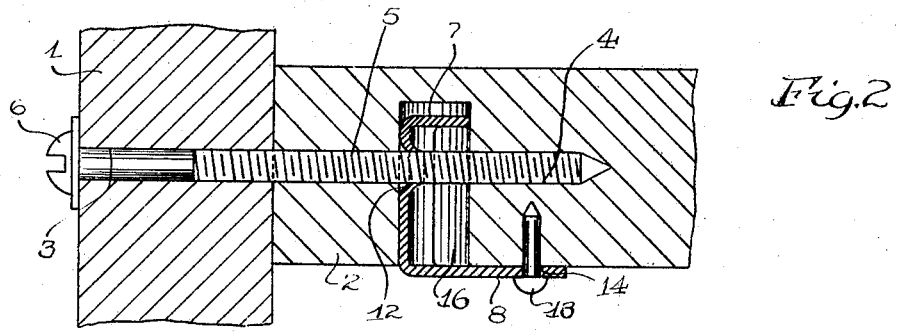
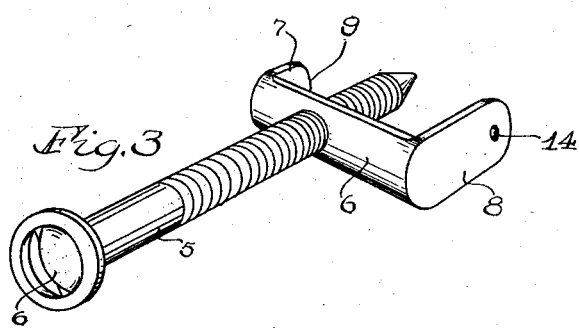
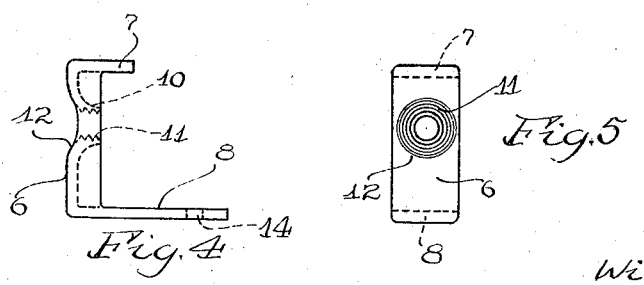
INVENTOR
William C. Baxter
BY
his ATTORNEY Patented Sept. 30, 1930

1,776,769

UNITED STATES PATENT OFFICE

WILLIAM C. BAXTER, OF ROCHESTER, NEW YORK, ASSIGNOR TO TRIMBLE NURSERY-LAND FURNITURE, INC., OF ROCHESTER, NEW YORK, A CORPORATION OF NEW YORK

FURNITURE JOINT

Application filed February 8, 1930. Serial No. 427,024.

The present invention relates to furniture joints and more particularly to the type in which two pieces are held together by a bolt the threads of which are engaged by a nut pocketed in one of the pieces.

An object of this invention is to so construct the nut that it may be retained in the pocket by a fastening device so that it will not become mislaid when the bolt is withdrawn.

Another object of the invention is to provide a nut construction which may be readily formed from a sheet stamping while having means by which it may be secured in the pocket.

Another object of the invention is to provide a nut construction which may be readily manipulated from the exterior of the pocket to properly present the screw threaded opening thereof to the bolt.

To these and other ends, the invention consists of certain parts and combinations of parts, all of which will be hereinafter described; the novel features being pointed out in the appended claims.

In the drawings:

Fig. 1 is a fragmentary view of two pieces from the under side;

Fig. 2 is a vertical section on the line 2—2, Fig. 1;

Fig. 3 is a perspective view of the bolt and the nut;

Fig. 4 is a detail view of one side of the nut; and

Fig. 5 is a detail view of another side of the nut.

In the illustrated embodiment of the invention 1 and 2 indicate two pieces of an article of furniture to be joined together. The piece 1 has a bore or bolt opening 3 extending therethrough whereas the piece 2 has a bolt opening 4 opening at one end only. A bolt 5 with a head 6 is projected into both openings 3 and 4.

The bolt opening 4 is intersected by a pocket 16 in which the nut by which the bolt is held is mounted. This pocket, in this instance, opens on the underside of the piece so as not to be visible from the top of the furniture.

The nut is of novel construction and, in this embodiment, comprises a central portion 6 and two arms 7 and 8 are formed from a sheet metal stamping. The central portion is curved transversely so that it conforms to the cylindrical wall of the pocket. The arm 7 is at the top of the central portion and is of such a length that its curved free edge 9 engages that portion of the pocket 5 opposite the portion engaged by the central portion 6 so as to permit the nut to turn in the pocket. The other arm 8 of the nut lies outside of the pocket and extends over the end of the pocket to close the same and also to project over the outer face of the pieces.

The central portion 6 is provided with a perforated boss 10 which is internally threaded at 11. This boss is pressed from the sheet metal and on the convex face of the central portion 6 a tapered depression 12 is provided which leads the bolt to the bolt opening in the nut. The arm 8 has two functions, first, it can be employed for turning the nut so as to align the opening with the bolt, and second, it can be employed for retaining the nut in the pocket after the position of the nut has been determined, so that when the bolt is withdrawn the nut will not drop from the pocket. For the latter purpose, a pin or other fastener 13 is passed through an opening 14 in the arm 8 and into the piece 2.

This construction provides an anchoring nut which is inexpensive to manufacture and easy to install, while at the same time permitting the pocket for the nut to be positioned in the under side of the piece 2 without danger of falling out when the bolt is removed.

What I claim as my invention and desire to secure by Letters Patent is:

1. In furniture, the combination with two pieces, one of which is provided with a nut receiving pocket and a bolt connecting said pieces and extending into the pocket, of a nut for the bolt having a central portion provided with a bolt opening for the bolt and curved to conform to the cylindrical wall of the pocket, and an arm extending laterally from the central portion at the inner end thereof, said arm having a curved end engaging a portion of the wall of the pocket opposite the portion engaged by the central portion.

2. In furniture, the combination with two pieces, one of which is provided with a nut receiving pocket and a bolt connecting said pieces and extending into the pocket, of a nut comprising a central portion provided with a bolt opening for the bolt and two arms extending laterally from the central portion at opposite ends thereof, the arm at the inner end of the bolt acting to hold the central portion against one side of the pocket and the arm at the outer end of the central portion extending over the pocketed piece to one side of the pocket and fastened to such piece.

3. In furniture, the combination with two pieces, one of which is provided with a nut receiving pocket of circular cross section and a bolt connecting said pieces and extending into the pocket, of a nut for the bolt rotatable in the pocket about the longitudinal axis of the pocket to aline the opening therein with the bolt and having an arm extending therefrom on the outside of the pocket for turning the nut in the pocket.

4. In furniture, the combination with two pieces, one of which is provided with a nut receiving pocket of circular cross section and a bolt connecting said pieces and extending into the pocket, of a nut for the bolt having a sheet metal central portion provided with a bolt opening for the bolt and curved to conform with the cylindical wall of the pocket, and an arm extending laterally from the central portion at the outer end thereof, said arm extending over the pocket to close the latter at one side of the central portion and also extending over the piece and being secured to the latter.

WILLIAM C. BAXTER.